(12) United States Patent
Lee et al.

(10) Patent No.: US 7,571,041 B2
(45) Date of Patent: Aug. 4, 2009

(54) AUTOMATIC CONTROL OF AUTOMOTIVE REARVIEW MIRROR

(75) Inventors: Yong H. Lee, Troy, MI (US); Weiwen Deng, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 569 days.

(21) Appl. No.: 11/035,338

(22) Filed: Jan. 13, 2005

(65) Prior Publication Data

US 2006/0155444 A1 Jul. 13, 2006

(51) Int. Cl.
*B60R 22/00* (2006.01)
(52) U.S. Cl. .......................... 701/49; 701/36; 359/843; 359/877; 307/10.1
(58) Field of Classification Search .................. 701/49, 701/211, 213, 36; 307/10.1; 359/843, 872, 359/877; 248/479–480; 370/436, 438
See application file for complete search history.

(56) References Cited

U.S. PATENT DOCUMENTS

| 4,267,494 | A | * | 5/1981 | Matsuoka et al. | ......... 318/568.1 |
| 4,679,158 | A | * | 7/1987 | Tate | ............ 700/302 |
| 4,936,670 | A | * | 6/1990 | Yoo | ............ 359/841 |
| 5,194,789 | A | * | 3/1993 | Barrs | ............ 318/565 |
| 5,196,965 | A | * | 3/1993 | Lang et al. | ............ 359/841 |
| 5,274,505 | A | | 12/1993 | Nagayama et al. | |
| 5,530,240 | A | * | 6/1996 | Larson et al. | ......... 250/214 AL |
| 5,627,688 | A | * | 5/1997 | Valentino | ............ 359/843 |
| 5,694,259 | A | * | 12/1997 | Brandin | ............ 359/843 |
| 5,706,144 | A | * | 1/1998 | Brandin | ............ 359/843 |
| 6,116,742 | A | * | 9/2000 | Ahn | ............ 359/843 |
| 6,140,933 | A | * | 10/2000 | Bugno et al. | ............ 340/693.5 |
| 6,176,587 | B1 | * | 1/2001 | Fredricks | ............ 359/843 |
| 6,193,380 | B1 | * | 2/2001 | Jacobs | ............ 359/843 |

(Continued)

FOREIGN PATENT DOCUMENTS

DE 4115474 A * 11/1992

(Continued)

OTHER PUBLICATIONS

Continuous 3D sensing for navigation and SLAM in cluttered and dynamic environments; Holz, D.; Lorken, C.; Surmann, H.; Information Fusion, 2008 11th International Conference on; Jun. 30, 2008-Jul. 3, 2008 pp. 1-7; Digital Object Identifier 10.1109/ICIF.2008.4632384.*

(Continued)

*Primary Examiner*—Cuong H Nguyen
(74) *Attorney, Agent, or Firm*—John A. Miller; Miller IP Group, PLC

(57) ABSTRACT

A side rearview mirror control system for a vehicle that automatically changes a rear viewing angle of a side rearview mirror. The control system receives various vehicle inputs to determine if and when a vehicle operator will turn the vehicle, make a lane change, merge into a lane of traffic, etc. The system pivots the mirror to eliminate a potential blind spot during these conditions. In one embodiment, the rear view mirror control system receives input signals from a vehicle hand-wheel angle sensor, a vehicle yaw rate sensor, a vehicle speed sensor, a turn signal indicator, a global positioning system (GPS) receiver and map information to determine whether the vehicle is turning or will be turning.

6 Claims, 4 Drawing Sheets

U.S. PATENT DOCUMENTS

| | | | |
|---|---|---|---|
| 6,350,037 | B1 | 2/2002 | Adams |
| 6,422,706 | B1 | 7/2002 | Rangan |
| 6,580,992 | B2 | 6/2003 | Whitten et al. |
| RE38,190 | E | 7/2003 | Jain et al. |
| 6,665,600 | B2 * | 12/2003 | Miller et al. ............... 701/49 |
| 6,672,728 | B1 * | 1/2004 | Su et al. ............... 359/843 |
| 6,672,731 | B2 | 1/2004 | Schnell et al. |
| 6,756,888 | B2 * | 6/2004 | Su et al. ............... 340/436 |
| 6,775,606 | B1 * | 8/2004 | Ertl et al. ............... 701/49 |
| 6,840,637 | B2 * | 1/2005 | Wang ............... 359/843 |
| 6,851,813 | B2 * | 2/2005 | Vandenbrink ............... 359/841 |
| 6,902,284 | B2 * | 6/2005 | Hutzel et al. ............... 359/865 |
| 7,004,593 | B2 * | 2/2006 | Weller et al. ............... 359/872 |
| 7,193,767 | B1 * | 3/2007 | Peeri ............... 359/290 |
| 7,373,249 | B2 * | 5/2008 | Ivanov ............... 701/213 |
| 2003/0043479 | A1* | 3/2003 | Su et al. ............... 359/843 |
| 2003/0151835 | A1* | 8/2003 | Su et al. ............... 359/843 |
| 2003/0160685 | A1* | 8/2003 | Su et al. ............... 340/425.5 |
| 2003/0191569 | A1* | 10/2003 | Su et al. ............... 701/49 |
| 2004/0032675 | A1* | 2/2004 | Weller et al. ............... 359/872 |
| 2004/0109247 | A1 | 6/2004 | Wang |
| 2005/0131609 | A1* | 6/2005 | Noda et al. ............... 701/49 |
| 2005/0154518 | A1* | 7/2005 | Huang et al. ............... 701/49 |
| 2006/0178787 | A1* | 8/2006 | McCall ............... 701/1 |

FOREIGN PATENT DOCUMENTS

| | | | |
|---|---|---|---|
| EP | 293396 | B * | 10/1991 |
| EP | 377559 | B * | 12/1991 |
| GB | 2222991 | A * | 3/1990 |
| JP | 01502255 | W * | 8/1989 |
| JP | 07277077 | A * | 10/1995 |
| JP | 2007045217 | A * | 2/2007 |
| JP | 2007069808 | A * | 3/2007 |
| KR | 97038177 | A * | 7/1997 |
| WO | WO 8804619 | A * | 6/1988 |
| WO | WO 9801320 | A1 * | 1/1998 |
| WO | WO 9826955 | A1 * | 6/1998 |
| WO | WO 9845142 | A1 * | 10/1998 |
| WO | WO 2006076105 | A2 * | 7/2006 |

OTHER PUBLICATIONS

Recognition of human driving behaviors based on stochastic symbolization of time series signal; Takano, W.; Matsushita, A.; Iwao, K.; Nakamura, Y.; Intelligent Robots and Systems, 2008. IROS 2008. IEEE/RSJ International Conference on; Sep. 22-26, 2008 pp. 167-172 ; Digital Object Identifier 10.1109/IROS.2008.4650671.*

Development of an Interactive Lane Keeping Control System for Vehicle; Jing-Fu Liu; Jui-Hung Wu; Yi-Feng Su; Vehicle Power and Propulsion Conference, 2007. VPPC 2007. IEEE; Sep. 9-12, 2007 pp. 702-706; Digital Object Identifier 10.1109/VPPC.2007.4544214.*

A virtual rider for motorcycles: An approach based on optimal control and maneuver regulation; Saccon, A.; Hauser, J.; Beghi, A.; Communications, Control and Signal Processing, 2008. ISCCSP 2008. 3rd International Symposium on; Mar. 12-14, 2008 pp. 243-248; Digital Object Identifier 10.1109/ISCCSP.2008.4537227.*

A control authority transition system for collision avoidance; Acarman, T.; Yaodong Pan; Ozguner, U.; Intelligent Transportation Systems, 2001. Proceedings. 2001 IEEE; Aug. 25-29, 2001 pp. 466-471; Digital Object Identifier 10.1109/ITSC.2001.948702.*

In-vehicle navigation devices: Effects on the safety of driver performance; Walker, J.; Alicandri, E.; Sedney, C.; Roberts, K.; Vehicle Navigation and Information Systems Conference, 1991; vol. 2, Oct. 20-23, 1991 pp. 499-525.*

Intelligent surround sensing using fuzzy inference system; Chan Yet, Wong.; Uvais Qidwai; Sensors, 2005 IEEE Oct. 30, 2005-Nov. 3, 2005 pp. 4 pp.; Digital Object Identifier 10.1109/ICSENS.2005.1597879.*

Inferring the driver's lane change intention using context-based dynamic Bayesian networks; Polling, D.; Mulder, M.; van Paassen, M.M.; Chu, Q.P.; Systems, Man and Cybernetics, 2005 IEEE International Conference on; vol. 1; Oct. 10-12, 2005 pp. 853-858 vol. 1; Digital Object Identifier 10.1109/ICSMC.2005.1571253.*

IEEE Std 1616—2004 IEEE Standard for Motor Vehicle Event Data Recorders (MVEDRs); 2005 pp. 0_1-163.*

Development, evaluation and introduction of a lane keeping assistance system; Ishida, S.; Gayko, J.E.; Intelligent Vehicles Symposium, 2004 IEEE; Jun. 14-17, 2004 pp. 943-944; Digital Object Identifier 10.1109/IVS.2004.1336512.*

* cited by examiner

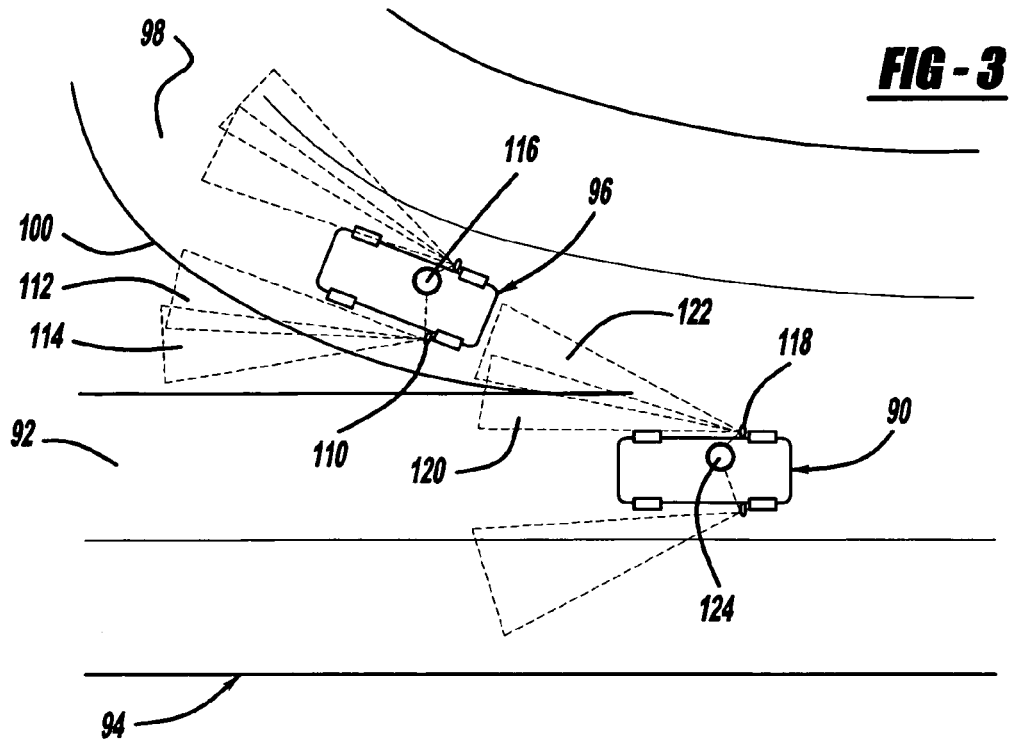
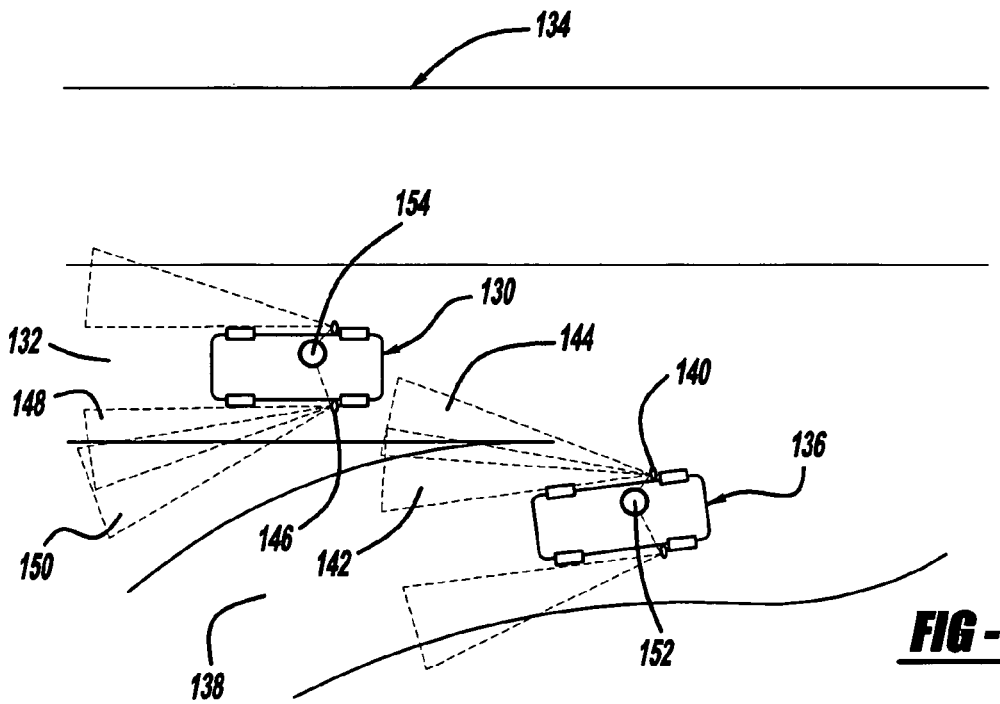

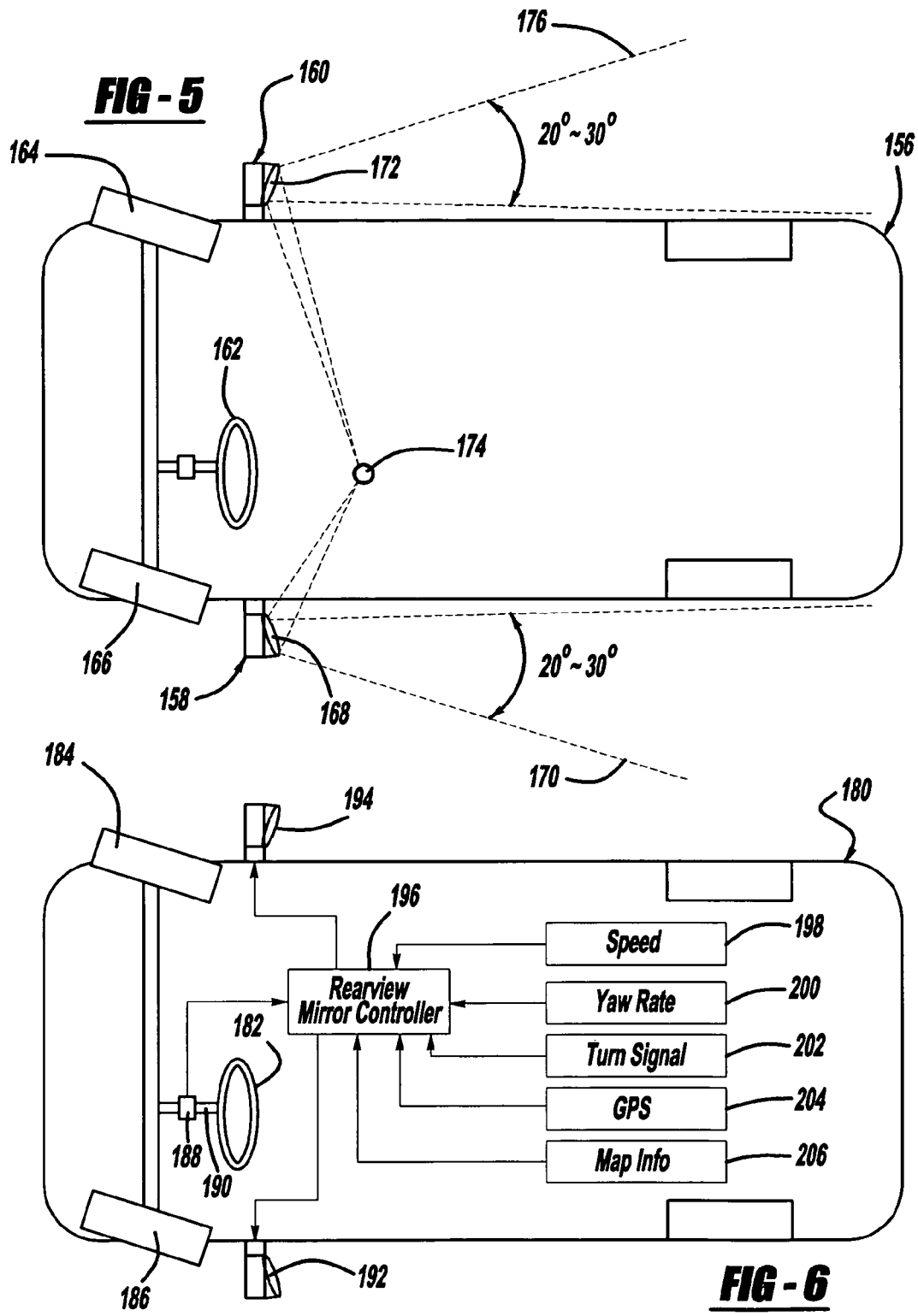

AUTOMATIC CONTROL OF AUTOMOTIVE REARVIEW MIRROR

BACKGROUND OF THE INVENTION

1. Field of the Invention

This invention relates generally to a control system for an automotive side rearview mirror and, more particularly, to a rearview mirror control system for automatically adjusting the rear viewing angle of an automotive side rearview mirror to eliminate a blind spot during certain vehicle operating conditions, such as lane changes and lane merging, based on input signals from one or more of vehicle speed, vehicle yaw rate, hand-wheel angle, turn signal information, GPS information, map information, etc.

2. Discussion of the Related Art

Automobile manufacturers are continuously looking for new systems and improvements for vehicles to prevent vehicular accidents, and protect vehicle occupants. One known vehicle safety system automatically turns the vehicle's headlights when the vehicle is turning a corner to allow the vehicle operator to see more of the road ahead. Vehicle side rearview mirrors are oriented to provide the vehicle operator with an optimum rear viewing zone behind and to the left and right of the vehicle to allow the vehicle operator to more safely operate the vehicle. However, when the vehicle is traveling around a corner, changing lanes, merging into a lane of traffic, etc., because the rear viewing zone is fixed there may be a blind spot in the optimum rear viewing angle that may prevent the operator from seeing other vehicles.

SUMMARY OF THE INVENTION

In accordance with the teachings of the present invention, a side rearview mirror control system for a vehicle is disclosed, where the system automatically changes the rear viewing angle of a vehicle side rearview mirror during certain vehicle operating conditions. The control system receives various vehicle inputs to determine if and when a vehicle operator will turn the vehicle, make a lane change, merge into a lane of traffic, etc. The system pivots one or both of the side rearview mirrors to eliminate a potential blind spot during these conditions. In one embodiment, the rearview mirror control system receives input signals from one or more of a vehicle hand-wheel angle sensor, a vehicle yaw rate sensor, a vehicle speed sensor, a turn signal indicator, a global positioning system (GPS) receiver and map information to determine whether the vehicle is turning or will be turning.

Additional advantages and features of the present invention will become apparent from the following description and appended claims, taken in conjunction with the accompanying drawings.

BRIEF DESCRIPTION OF THE DRAWINGS

FIG. 3 is a plan view of two vehicles merging from two two-lane highways onto a three-lane highway, where the vehicles include a side rearview mirror control system for automatically adjusting the rear viewing angle of the side rearview mirrors of the vehicle to eliminate potential blind spots, according to an embodiment of the present invention;

FIG. 4 is a plan view of a vehicle merging onto a highway, where the vehicle includes a side rearview mirror control system for automatically adjusting the rear viewing angle of the side rearview mirrors of the vehicle to eliminate potential blind spots, according to an embodiment of the present invention;

FIG. 5 is a plan view of a vehicle including a side rearview mirror control system for pivoting side rearview mirrors of the vehicle, according to an embodiment of the present invention;

FIG. 6 is a block diagram plan view of a vehicle including a rearview mirror control system, according to an embodiment of the present invention.

DETAILED DESCRIPTION OF THE EMBODIMENTS

The following discussion of the embodiments of the invention directed to a side rearview mirror control system for adjusting the rear viewing angle of the side mirrors of a vehicle in response to input information is merely exemplary in nature, and is in no way intended to limit the invention or its applications or uses.

Figure 1:
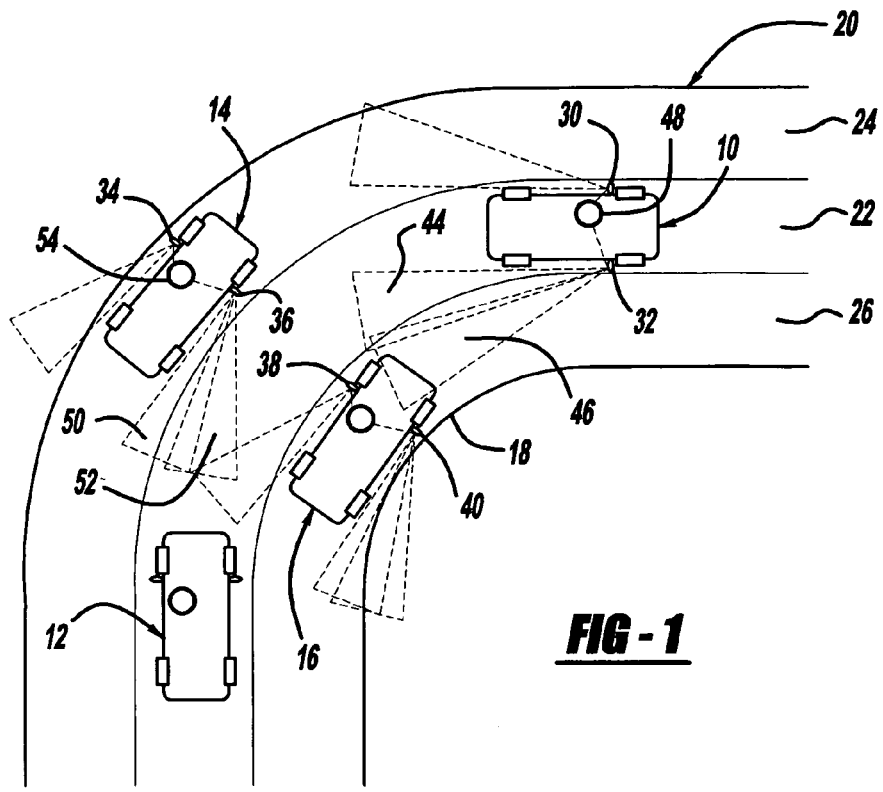
FIG. 1 is a plan view of a plurality of vehicles turning a corner on a three-lane road, where the vehicles employ a rearview mirror control system for automatically adjusting the rear viewing angle of the side rearview mirrors of the vehicle to eliminate potential blind spots during the turn, according to an embodiment of the present invention.

FIG. 1 is a plan view of four vehicles 10, 12, 14 and 16 traveling around a corner 18 on a three-lane road 20. The vehicle 10 is in a center lane 22 of the road 20 and has just completed traveling around the corner 18. The vehicle 12 is in the center lane 22 of the road 20 and is approaching the corner 18. The vehicle 14 is in an outer lane 24 of the road 20 and is in the corner 18, and the vehicle 16 is in an inner lane 26 of the road 20 and is in the corner 18. The vehicle 10 includes a driver side rearview mirror 30 and a passenger side rearview mirror 32, the vehicle 14 includes a driver side rearview mirror 34 and a passenger side rearview mirror 36, and the vehicle 16 includes a driver side rearview mirror 38 and a passenger side rearview mirror 40.

According to the invention, the rearview mirrors 30-40 of the vehicles 10, 14 and 16 are automatically pivoted to change the rear viewing zones of the mirrors 30-40 to eliminate potential blind spots that may occur as a result of turning the corner 18. Particularly, the passenger side rearview mirror 32 of the vehicle 10 automatically pivots a predetermined number of degrees away from the vehicle 10 from a normal rear viewing zone 44 to a modified rear viewing zone 46. Therefore, a vehicle operator 48 operating the vehicle 10 will be able to better see the vehicle 16 in the inner lane 26 during the turn. Likewise, the passenger side rearview mirror 36 of the vehicle 14 automatically pivots outward from a normal rear viewing zone 50 to a modified rear viewing zone 52 so a vehicle operator 54 of the vehicle 14 can more easily see the vehicle 12.

Figure 2:
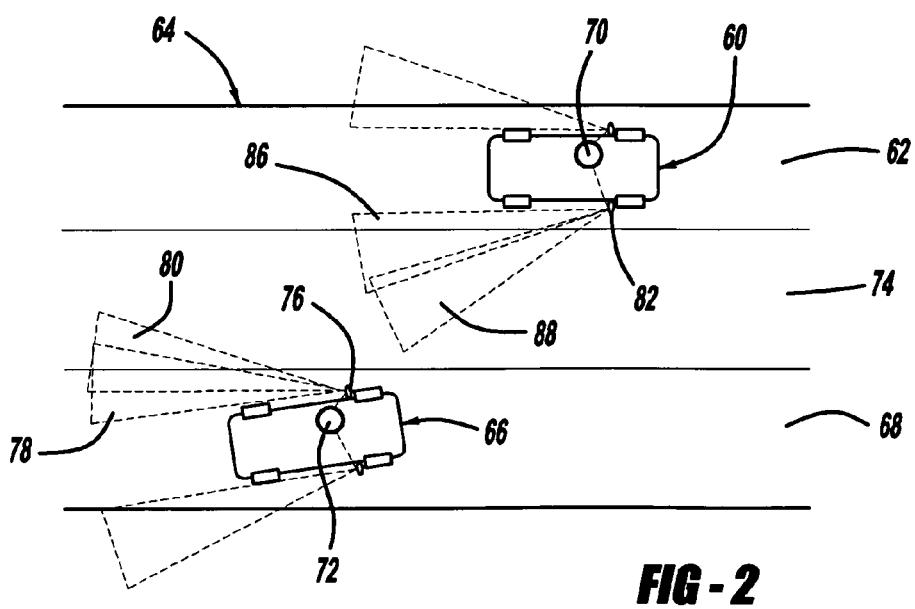
FIG. 2 is a plan view of two vehicles traveling on a three-lane highway, where the vehicles employ a rearview mirror control system for automatically adjusting the rear viewing angle of the side rearview mirrors of the vehicle to eliminate potential blind spots during-lane changing, according to an embodiment of the present invention.

FIG. 2 is a plan view of a vehicle 60 traveling down an outer lane 62 of a three-lane highway 64 and a vehicle 66 traveling down an inner lane 68 of the highway 64. In this illustration, a vehicle operator 70 of the vehicle 60 and a vehicle operator 72 of the vehicle 66 both intend to make a lane change to a center lane 74 of the highway 64. When the vehicle operators 70 and 72 put on their respective turn signals to make the lane change, or turn the vehicle hand-wheel, a driver side rearview mirror 76 of the vehicle 66 is automatically adjusted from a normal rear viewing zone 78 to a modified rear viewing zone 80 to allow the vehicle operator 72 to better see into the center lane 74. Likewise, a passenger side rearview mirror 82 of the vehicle 60 is automatically adjusted from a normal rear viewing zone 86 to a modified rear viewing zone 88 to allow the vehicle operator 70 to better see the center lane 74 and the vehicle 66. In this illustration, the vehicle operator 72 has already begun to make the lane change from the lane 68 to the lane 74. Therefore, the vehicle operator 70 should yield to the vehicle 66. Because the rearview mirror 82 has been adjusted to the modified rear viewing zone 88, the vehicle operator 70 is better able to see the vehicle 66 moving into the lane 74.

FIG. 3 is a plan view of a vehicle 90 traveling down an inner lane 92 of a two-lane highway 94 and a vehicle 96 traveling down an inner lane 98 of a two-lane highway 100, where the two-lane highway 94 and 100 merge into a three-lane highway. Based on predetermined input, such as map or GPS information, a passenger side rearview mirror 110 of the vehicle 96 is automatically pivoted outward from a normal rear viewing zone 112 to a modified rear viewing zone 114 as the vehicle 96 approaches the merge of the highways 94 and 100 so that a vehicle operator 116 can better see the lane 92 when the highways 94 and 100 merge. Likewise, a driver side rearview mirror 118 of the vehicle 90 is automatically pivoted outward from a normal rear viewing zone 120 to a modified rear viewing zone 122 as the vehicle 90 approaches the merge of the highways 94 and 100 so that a vehicle operator 124 can better see the lane 98 and the vehicle 96. In this illustration, the vehicle 90 may have the right of way over the vehicle 96. By providing the modified rear viewing zone 122, the vehicle operator 124 may speed up the vehicle 90 to more safely enter the merge ahead of the vehicle 96.

FIG. 4 is a plan view of a vehicle 130 traveling down a right lane 132 of a two-lane highway 134. A vehicle 136 is entering the lane 132 from a merge lane 138. Based on predetermined input, such as map or GPS information, a driver side rearview mirror 140 of the vehicle 136 is automatically pivoted from a normal rear viewing zone 142 to a modified rear viewing zone 144 as the vehicle 136 merges onto the highway 134 so that a vehicle operator 152 can better see the lane 132 and the vehicle 130. Likewise, a passenger side rearview mirror 146 of the vehicle 130 is automatically pivoted from a normal rear viewing zone 148 to a modified rear viewing zone 150 to eliminate a potential blind spot and allow a vehicle operator 154 to better see the merge lane 138. In this illustration, the vehicle operator 152 should yield to the vehicle 130. By providing the modified rear viewing zone 144, the vehicle operator 152 is able to better see the vehicle 130, and take the appropriate driving maneuver, such as speeding up.

FIG. 5 is a plan view of a vehicle 156 including a driver side rearview mirror assembly 158 and a passenger side rearview mirror assembly 160. The vehicle 156 also includes a hand-wheel 162 for turning front wheels 164 and 166 of the vehicle 156. The driver side rearview mirror assembly 158 includes a flat mirror 168 that is about 200 mm in length, and provides a vehicle operator 174 with a 20°-30° rear field-of-view zone 170 on the driver's side of the vehicle 156. The passenger side rearview mirror assembly 160 includes a convex mirror 172 that provides the vehicle operator 174 with a 20°-30° rear field-of-view zone 176 on the passenger side of the vehicle 156. The curvature of the mirror 172 is selected so that the vehicle operator 174 has the same field-of-view on the passenger side as he does on the driver side, without having to increase the size of the mirror 172, because of the increased distance between the vehicle operator 174 and the mirror 172. The size and curvature of the mirrors 168 and 172 and the size of the zones 170 and 176 are determined by federal rearview mirror standards.

The mirrors 168 and 172 pivot a predetermined amount, such as 5°, from the normal rear viewing zone to the modified rear viewing zone, according to one non-limiting embodiment of the present invention. The 5° of mirror rotation pivots the mirror zones 170 and 176 10° away from the vehicle 156. The size of the zones 170 and 176 remains about the same, but the direction of the zones 170 and 176 changes.

Many different designs are known in the art for pivoting or actuating a mirror of a rearview mirror assembly. The present invention proposes using any suitable mirror actuation system that receives a control signal, as will be discussed in detail below, to provide articulation of the mirror during the various vehicle operating conditions discussed above.

FIG. 6 is a plan view of a vehicle 180 including a vehicle hand-wheel 182 for steering front wheels 184 and 186 of the vehicle 180. A hand-wheel angle sensor 188 is coupled to a column 190 that is rotated when the hand-wheel 182 is rotated to turn the wheels 184 and 186, where the sensor 188 provides a signal indicative of the rotation. The vehicle 180 includes a driver side rearview mirror 192 and a passenger side rearview mirror 194. The rearview mirrors 192 and 194 are pivoted to eliminate potential blind spots during lane changing, merging, turning, etc., as discussed above. A rearview mirror control system 196 automatically controls the position of the mirrors 192 and 194 during these vehicle operation conditions.

The rearview mirror control system 196 receives vehicle operation information from a vehicle speed sensor 198, a vehicle yaw rate sensor 200, a turn signal sensor 202, an output of a GPS receiver 204 and digital map information 206. Further, the rearview mirror control system 196 receives the hand-wheel angle signal from the hand-wheel angle sensor 188. All of the inputs to the rearview mirror control system 196 discussed above are available from known vehicle sensors and systems used for other vehicle systems, such as vehicle stability and enhancement systems.

The rearview mirror control system 196 uses the sensor signals to determine if and when the rear viewing zone of the rearview mirrors 192 and 194 need to be changed, consistent with the discussion above, to eliminate a potential blind spot. For example, if the rearview mirror control system 196 determines from map information and/or GPS information that a turn in the road is coming up, or a lane merge is coming up, etc., the rearview mirror control system 196 will adjust the appropriate rear viewing zone of the mirror 192 or 194 before the event occurs to eliminate the potential blind spot. Likewise, if the vehicle operator turns on the turn signal or begins a turn for a lane change, lane merge, etc., the rearview mirror control system 196 can adjust the rear viewing zone of the mirror 192 or 194 accordingly to eliminate the potential blind spot. Further, the rearview mirror control system 196 can use the hand-wheel angle signal, the vehicle speed signal and the vehicle yaw rate signal to determine the appropriate position of the mirrors 192 and 194 for banked turns. The hand-wheel angle sensor 188 and the vehicle yaw rate sensor 200 give the control system 196 similar information, but, for example, if the vehicle 180 is turning on a banked road, the vehicle yaw rate may be greater than what is indicated by the hand-wheel sensor 188.

The discussion above describes changing the rear viewing zones of the mirrors 192 and 194 from a normal rear viewing position to a modified rear viewing position, and then back again. However, in an alternate embodiment, the rearview mirror control system 196 can selectively change the rear viewing angle of the mirrors 192 and 194 continuously over a range of angles or at several discreet rear viewing positions depending on the vehicle driving condition. The rearview mirror control system 196 can use a simple algorithm that adjusts the viewing angle of the mirrors 192 and 194 from a normal rear viewing zone to a modified rear viewing zone based on only a few inputs. Alternately, the rear view mirror control system 196 can employ a sophisticated algorithm that changes the rear viewing zones of the mirrors 192 and 194 over a predetermined range based on many inputs for the various sensors discussed above.

Figure 7:
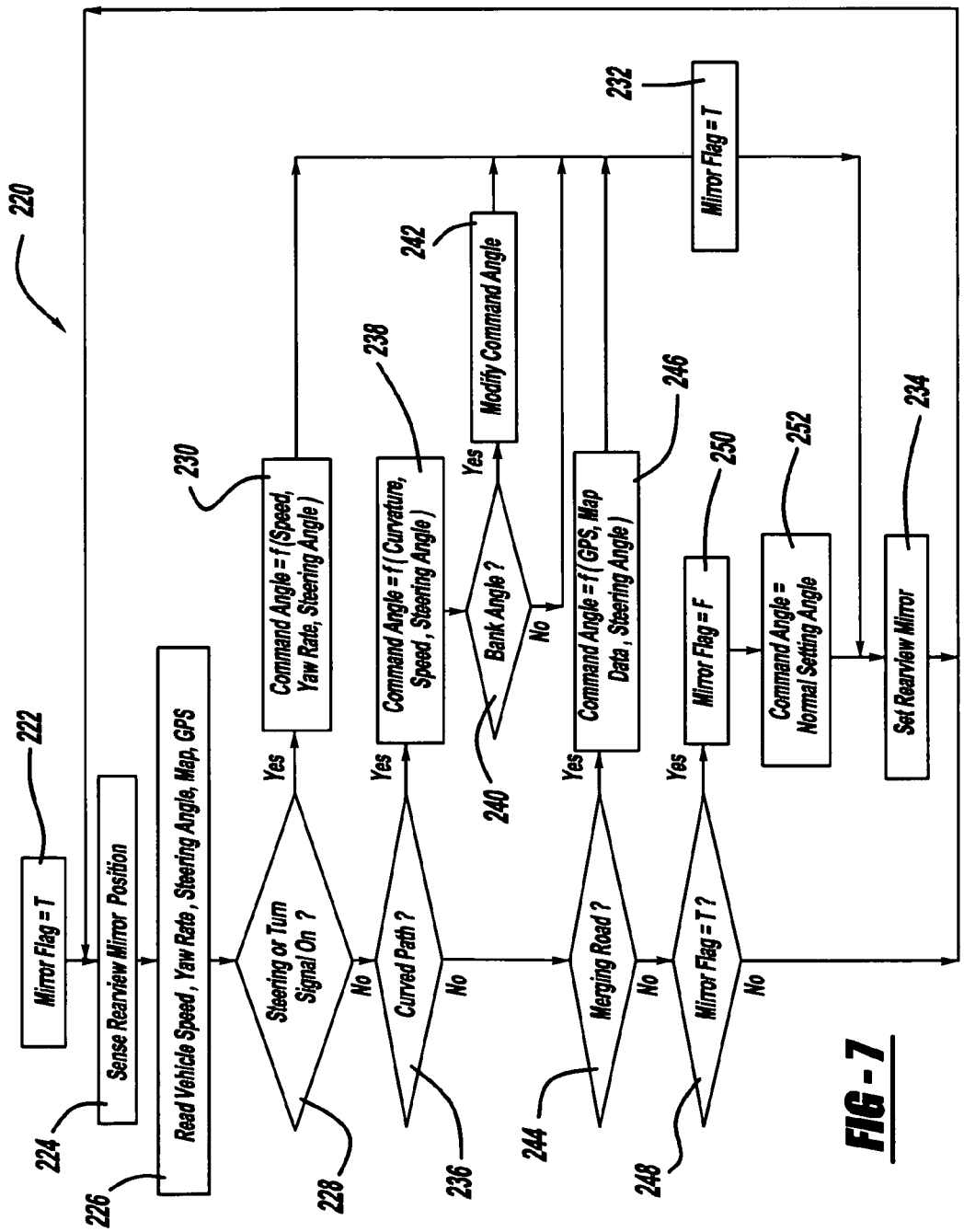
FIG. 7 is a flow chart diagram showing a process for adjusting the side rearview mirrors of a vehicle in response to certain input signals to eliminate potential blind spots, according to an embodiment of the present invention.

FIG. 7 is a flow chart diagram 220 showing one possible operation of the control algorithm for the rearview mirror control system 196 for controlling the position of the rearview mirrors 192 and 194. The algorithm sets a mirror flag equal to true (T) at box 222. The algorithm then senses the position of the rearview mirrors 192 and 194 at box 224 to determine whether they are in the normal rear viewing position or the modified rear viewing position. The algorithm then reads the sensor and information signals at box 226 for vehicle speed, vehicle yaw rate, steering angle, hand-wheel position, map information and GPS information, as discussed above.

The algorithm then determines whether the hand-wheel 182 is turned or the turn signal is on at decision diamond 228 to determine if the vehicle operator is intending to make a right or left turn, such as for a lane change. If the hand-wheel 182 is turned or the turn signal is on at the decision diamond 228, then the algorithm calculates a command signal that determines the appropriate position of the appropriate rearview mirror 192 or 194 based on the direction of the turn signal, the vehicle speed, the vehicle yaw rate and/or the hand-wheel angle at box 230. The algorithm then sets the mirror flag equal to true at box 232 if it has not already been set to true at the box 222, and sets the calculated position of the appropriate rearview mirror 190 and/or 192 at box 234. The algorithm then returns to the box 224 to determine the position of the rearview mirrors 190 and 192.

If the algorithm determines that the hand-wheel 182 is not turned and the turn signal is not on at the decision diamond 228, the algorithm determines whether the vehicle 180 is or will be traveling on a curved path at decision diamond 236 based on MAP and GPS data. If the vehicle 180 is or will be traveling along a curved path, the algorithm then calculates a command signal for adjusting the appropriate rearview mirror 190 or 192 to change the rear viewing position based on the amount of curvature of the path, the vehicle speed and/or the hand-wheel angle at box 238. If the curved path in the road is banked, then the rear viewing zone of the mirror 190 or 192 may need to be increased for the appropriate viewing angle. Therefore, the algorithm determines whether the curve in the road is banked at decision diamond 240. This information can be taken from map information, or by comparing the amount the vehicle operator is turning the hand-wheel 182 to the actual vehicle yaw rate. If the turn is banked at the decision diamond 240, then the algorithm modifies the command angle at box 242 for a banked turn, and proceeds to set the mirror flag equal to true at the box 232 and set the position of the appropriate rearview mirror 190 or 192 at the box 234. The algorithm then returns to the box 224 to determine the position of the rearview mirrors 190 and 192.

If the algorithm determines that the hand-wheel 182 is not turned and the turn signal is not on at the decision diamond 228 and the vehicle 180 is not traveling on a curved path at the decision diamond 236, then the algorithm determines whether the vehicle 180 is merging onto a road at decision diamond 244. If the vehicle 180 is merging at the decision diamond 244, then the algorithm calculates the command signal for setting the position of the appropriate rearview mirror 190 or 192 at box 246 based on map information, GPS receiver information and/or the hand-wheel angle signal. The algorithm then proceeds to set the mirror flag equal to true at the box 232 and set the angle of the rearview mirror 190 or 192 at the box 234. The algorithm then returns to the box 224 to determine the position of the rearview mirrors 190 and 192.

If the algorithm determines that the hand-wheel 182 is not turned and the turn signal is not on at the decision diamond 228, the vehicle 180 is not traveling on a curved path at the decision diamond 236 and the vehicle 180 is not merging at the decision diamond 244, the algorithm determines whether the mirror flag is set to true at decision diamond 248. If the mirror flag is set to true at the decision diamond 248, then the algorithm sets the mirror flag equal to false at box 250, generates a mirror position command signal for the normal rearview zone at box 252 and sets the normal rear viewing angle at the box 234. The algorithm then proceeds to detect the position of the mirrors 192 and 194 at the box 224, continually following through the flow chart 220 as the vehicle conditions change.

The order of determining whether the hand-wheel is turned or the turn signal is on at the decision diamond 228, whether the vehicle 180 is or will be traveling on a curved path at the decision diamond 236 and whether the vehicle 180 is merging onto a road at the decision diamond 244 can be changed in other embodiments.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A system for automatically adjusting a vehicle side rearview mirror between a normal rear viewing zone and a modified rear viewing zone based on predetermined vehicle operating conditions, said system comprising:
    a plurality of sensors for providing signals indicative of a vehicle turning condition or a potential turning condition, said plurality of sensors including a vehicle hand-wheel angle sensor, a vehicle yaw rate sensor and a vehicle turn signal sensor; and
    rearview mirror controller for controlling the position of the rearview mirror, said rearview mirror controller being responsive to the signals and changing the rear viewing angle of the mirror between the normal rear viewing zone and the modified rear viewing zone in response to turning of the vehicle or an anticipated turn of the vehicle.

2. The system according to claim 1 wherein the difference between the normal rear viewing zone and the modified rear viewing zone is about 5°.

3. The system according to claim 1 wherein the rearview mirror controller moves the mirror to any location in a predetermined range of positions.

4. A vehicle comprising:
    a rearview mirror assembly including a mirror, said mirror being automatically adjustable relative to the mirror assembly so as to change the rear viewing angle of the mirror;
    a vehicle hand-wheel angle sensor for providing a signal of the position of a vehicle hand wheel;
    a vehicle speed sensor for providing a signal of the vehicle speed;

a vehicle yaw rate sensor for providing a signal of the vehicle yaw rate;

a vehicle turn signal sensor for providing a signal that a vehicle turn signal is on;

a GPS receiver and digital map for providing a signal of the position of the vehicle and road information; and a rearview mirror controller for controlling the position of the mirror, said rearview mirror controller being responsive to the signals from the vehicle hand-wheel angle sensor, the vehicle speed sensor, the vehicle yaw rate sensor, the vehicle turn signal sensor, the GPS receiver and the digital map, said rearview mirror controller setting the position of the mirror based on the signals, wherein the rearview mirror controller moves the mirror from a normal rear viewing zone to a modified rear viewing zone in response to turning of the vehicle or an anticipated turn of the vehicle, a merge condition or a lane change condition.

5. The vehicle according to claim 4 wherein the position of the mirror is moved about 5°.

6. The vehicle according to claim 4 wherein the rearview mirror controller moves the mirror to any location in a predetermined range of positions.

* * * * *